United States Patent
Chen et al.

(10) Patent No.: US 10,315,347 B2
(45) Date of Patent: Jun. 11, 2019

(54) INJECTION MOLDING APPARATUS WITH SPHERICAL ROTOR

(71) Applicant: Shunde Polytechnic, Foshan, Guangdong (CN)

(72) Inventors: Xuefeng Chen, Guangdong (CN); Mingxia Tu, Guangdong (CN); Yansheng Xu, Guangdong (CN)

(73) Assignee: Shunde Polytechnic, Foshan (CN)

( * ) Notice: Subject to any disclaimer, the term of this patent is extended or adjusted under 35 U.S.C. 154(b) by 0 days.

(21) Appl. No.: 16/018,051

(22) Filed: Jun. 26, 2018

(65) Prior Publication Data

US 2018/0297259 A1    Oct. 18, 2018

Related U.S. Application Data (63) Continuation of application No. PCT/CN2016/092828, filed on Aug. 2, 2016.

(30) Foreign Application Priority Data

Apr. 25, 2016 (CN) .......................... 2016 1 0263499

(51) Int. Cl.
*B29C 45/53* (2006.01)
*B29C 45/54* (2006.01)
(Continued)

(52) U.S. Cl.
CPC .............. *B29C 45/54* (2013.01); *B29C 45/53* (2013.01); *B29C 45/585* (2013.01);
(Continued)

(58) Field of Classification Search
CPC ....... B29C 45/53; B29C 45/54; B29C 45/541; B29C 45/585; B29C 45/586; B29C 45/60;
(Continued)

(56) References Cited

U.S. PATENT DOCUMENTS 3,021,561 A * 2/1962 Reifenhauser .......... B29C 45/48
425/208
3,695,575 A * 10/1972 Hauser .................... B29C 45/53
366/76.1
(Continued)

FOREIGN PATENT DOCUMENTS

CN    2218072 Y    1/1996
CN    1579735 A    2/2005
(Continued)

*Primary Examiner* — Joseph S Del Sole
*Assistant Examiner* — Emmanuel S Luk
(74) *Attorney, Agent, or Firm* — Wayne & Ken, LLC; Tony Hom (57) ABSTRACT

The present invention relates to an injection molding apparatus with a spherical rotor. The injection molding apparatus includes an injection oil cylinder, an injection base frame, a motor, a transmission mechanism, bases, radial thrust bearings, a hopper, a machine barrel, an electric heater, a moving oil cylinder, a gear and a plunger. The apparatus further includes a plasticizing rotor and the plasticizing rotor includes a hemispherical rotor and a cylinder integrated with the hemispherical rotor. Continuous external thread grooves are provided on the hemispherical rotor. The machine barrel includes a hemispherical plasticizing cavity and an injection barrel. The hemispherical rotor is located in the hemispherical plasticizing cavity and is rotatable. The hopper is installed on the plasticizing cavity. The apparatus with the spherical rotor has the advantages of strong plasticizing, pulverizing and extruding ability, good quality of molded products and the like.

5 Claims, 5 Drawing Sheets

(51) Int. Cl.
*B29C 45/60* (2006.01)
*B29C 45/58* (2006.01)
*B29C 45/62* (2006.01)
*B29C 45/17* (2006.01)

(52) U.S. Cl.
CPC ............ *B29C 45/586* (2013.01); *B29C 45/60* (2013.01); *B29C 45/62* (2013.01); *B29C 2045/1794* (2013.01); *B29C 2045/547* (2013.01)

(58) Field of Classification Search
CPC ............ B29C 45/62; B29C 2045/1794; B29C 2045/547; B29C 2045/548; B29C 2045/537
See application file for complete search history.

(56) References Cited

U.S. PATENT DOCUMENTS

| | | | | |
|---|---|---|---|---|
| 3,837,536 | A * | 9/1974 | Hauser | B29C 45/46 222/146.6 |
| 4,553,922 | A * | 11/1985 | Winner | B01F 7/00816 425/381.2 |
| 4,770,624 | A * | 9/1988 | Ziegler | B29C 48/30 425/208 |
| 5,439,633 | A * | 8/1995 | Durina | B29B 7/428 264/328.17 |
| 6,187,229 | B1 | 2/2001 | Takayama et al. | |
| 6,200,126 | B1 * | 3/2001 | Lohl | B29C 45/27 425/557 |
| 7,686,604 | B2 * | 3/2010 | Hahn | B29C 45/541 366/100 |
| 2005/0220930 | A1* | 10/2005 | Nishizawa | B29C 45/54 425/567 |
| 2007/0104021 | A1* | 5/2007 | Okabe | B29C 45/581 366/80 |
| 2011/0118103 | A1* | 5/2011 | Bolden | B01F 7/00816 501/134 |

FOREIGN PATENT DOCUMENTS

| | | |
|---|---|---|
| CN | 105751459 A | 7/2016 |
| CN | 205705153 U | 11/2016 |
| DE | 3839021 A1 | 6/1989 |

\* cited by examiner

INJECTION MOLDING APPARATUS WITH SPHERICAL ROTOR

TECHNICAL FIELD

The present invention relates to an injection molding apparatus with a spherical rotor. The injection molding apparatus with a spherical rotor is mainly used for plasticizing and injection molding of a polymer material and belongs to the technical field of material and polymer material injection molding equipment.

BACKGROUND

Plastic injection molding processing has the advantages of simple technology, high production efficiency, accurate size of a product and the like and is capable of forming the product with a complicated appearance at one time within a relatively short time. A plasticizing injection apparatus is one of core structures of an injection molding device. The performance of the plasticizing injection apparatus directly influences the injection molding efficiency, the production cost, the production environment and the like, and also has a decisive influence on the quality of an injection molded product.

For traditional screw and plunger type injection molding machines, a single-screw extrusion feeding apparatus which is used for plasticization only is added on a plunger type injection apparatus. Material shall be plasticized by a single-screw plasticizing apparatus firstly and then enters an injection material barrel through a check valve; and when a feeding quantity reaches a metering value, a plasticizing screw stops rotating, and an injection plunger starts to perform injection. The problem of this mode is that more retarded materials often exist in the material barrel, and cleaning of the material barrel is not convenient. Because two material barrels (a plasticizing material barrel and an injection material barrel) are needed, the volume of the machine and the amount of parts are increased, and the manufacturing cost is high. Moreover, the total energy consumption is increased because two heating systems are needed to heat the screw plasticizing system and a plunger injection system respectively.

For a traditional reciprocating screw type injection molding machine, the injection plunger is cancelled, and the screw has double functions of plasticization and injection at the same time, so that the screw needs to perform rotary movement to finish plasticization of the materials and also needs to perform reciprocating axial movement for injection at the same time, greatly increasing the complexity and the difficulty of the entire system and the manufacturing cost, the use cost and the maintenance cost. Moreover, during plasticization, with the axial movement of the screw, an axial temperature difference formed by molten material temperatures is relatively large and is difficult overcome.

The traditional injection machines also have one characteristic that the screw is generally adopted to plasticize the materials. Although plasticization with the screw has advantages, the screw has the disadvantages of poor plasticization capability, poor crushing capability and poor extrusion capability with respect to some materials.

For the problems of the traditional injection machines, although many researchers make researches, the researches are limited to local changes of the screw, the plunger, a control system or other components only and do not solve the above fundamental problems of the entire system. Therefore, the entire structure and the action principles thereof must be changed, so as to realize entire and fundamental improvement.

Some researches introduce vibration into the field of plastic processing molding, and optimize the extrusion process by utilizing influences of vibration of the screw on material plasticization and extrusion processes, so as to improve the quality of an extruded product.

Other researches utilize vibration of the plunger or a piston to achieve the purpose of optimizing the plasticization, the extrusion and the injection. Foreign literatures [1, 2] introduce a developed rheological injection moulding machine. A polymer melt is injected into a vibration cavity from the material barrel under the action of the screw firstly; the direction of a valve is switched; and vibration is applied by the piston; and then, the polymer melt is injected into a mould cavity by the piston, and the pressure vibration action is continuously applied to the melt before a mould gate is frozen while the pressure is maintained.

To sum up, in the existing researches on introduction of vibration into the injection and extrusion processes, in some researches, vibration is applied to the screw to optimize the injection and extrusion processes; and in some researches, vibration is applied to the plunger or the piston which is not installed in one machine barrel with the screw, so as to influence the polymer melt and further improve the performance of a final product.

REFERENCES

[1] Ibar J P. Control of polymer properties by melt vibration technology: a review. Polymer Engineering and Science. 1998; 38(1):1-20

[2] A Minardi, M Boudeulle, E Duval, S Etienne. The effect of the moulding conditions on the semicrystalline structure of polypropylene. Polymer. 1997, 38(15):3957-3965.

SUMMARY

An objective of the present invention is to overcome the deficiencies of the prior art and provide an injection molding apparatus with a spherical rotor. The injection molding apparatus with the spherical rotor has strong plasticization capability, strong crushing capability and strong extrusion capability and is good in quality of a product produced by the injection molding apparatus.

To achieve the above objective, the present invention is realized as follows: the injection molding apparatus with the spherical rotor comprises an injection oil cylinder, an injection base frame, a motor, a transmission mechanism, bases, radial thrust bearings, a hopper, a machine barrel, an electric heater, a moving oil cylinder, a gear and a plunger, wherein the injection oil cylinder, the motor and the transmission mechanism are fixedly connected with the injection base frame together, and a push rod of the moving oil cylinder is connected with the injection base frame, wherein the injection molding apparatus with the spherical rotor also comprises a plasticizing rotor; the plasticizing rotor comprises a hemispherical rotor and a cylinder which is connected with the hemispherical rotor to form a whole body; the hemispherical rotor is provided with a continuous external thread grooves; center holes are formed in the hemispherical rotor and the cylinder respectively; the machine barrel comprises a hemispherical plasticizing cavity and an injection barrel; the hemispherical rotor is located in the hemispherical plasticizing cavity and can rotate; the hopper is installed on the plasticizing cavity; the left end of the external thread groove is communicated with the hopper; the right end of the external thread groove is communicated with the injection barrel; the radial thrust bearings and the gear are installed on the cylinder; the radial thrust bearings are installed on the bases; the plunger is located in the center holes of the hemispherical rotor and the cylinder as well as the injection barrel and can axially move; and the right part of the plunger is in clearance fit with the injection barrel.

In the technical solution, the injection molding apparatus with the spherical rotor also comprises a vibration apparatus and a movement controller; the movement controller controls vibration of the vibration apparatus; the vibration apparatus is installed between the plunger and the push rod of the injection oil cylinder; and the vibration apparatus drives the plunger to perform movements, such as axial vibration, circumferential vibration, and the axial vibration with the circumferential vibration or drives the plunger to perform circumferential rotation movement.

In the technical solution, there are two different cases.

One case of the technical solution is as follows: an inner hole of the injection barrel is a stepped hole; a portion with larger aperture in the stepped hole is communicated with a plasticizing region, and a portion with smaller aperture in the stepped hole is communicated with an injection hole; a certain gap is reserved between the external circular surface of the right part of the plunger and a section with larger aperture in the stepped hole, and a plasticized melt can enter the right section of the injection barrel through the gap under the pressure; and the external circular surface of the right part of the plunger is in sliding fit with the portion with smaller aperture in the stepped hole, but the melt cannot pass through a fitting gap between the external circular surface of the right part of the plunger and the portion.

The other case of the technical solution is as follows: the inner hole of the injection barrel is a straight-through hole; a gap, through which the melt can pass, is reserved between the external circular surface of the right part of the plunger and the whole section of the inner hole of the injection barrel; and when the plunger is in any axial position of the injection barrel of the machine barrel, the plasticized melt enters the right end of the injection barrel through the gap under the pressure.

In another technical solution, the right end of the plunger is provided with a check valve which is used for preventing the material from returning; and the check valve located in the injection barrel and can axially move in the injection barrel.

Compared with the prior art, the present invention has the following advantages:

1. A plasticizing portion adopts a structure of a cylinder and a hemispherical thread groove; and with such method, the traditional screw plasticizing mode is changed, and a new-style thread groove is utilized to plasticize an extruded material, achieving change and improvement in principle; the present invention has the advantages of strong plasticization capability, strong crushing capability and strong extrusion capability and is especially beneficial for materials which are difficult to plasticize.

2. A vibration force field is introduced into the plastic injection and extrusion molding process, thereby greatly influencing the processing, reducing the effective viscoelasticity and the viscosity of the plastic melt, increasing the fluidity, lowering the injection pressure, increasing the flow rate, enhancing the mixing shearing of the material and obviously improving the performance of a formed product; through tests of mechanical performance, DSC and density on the vibrated injection molded product, it is discovered that the tensile strength and the impact strength of the injection molded product are improved, the density is increased, the degree of crystallinity of a sample is increased, and the internal quality and the appearance quality of the product are greatly improved and enhanced.

3. Compared with vibration in other structural forms in the plastic processing molding, the patent has the advantage of simple and reliable structure; and the advantage is more obvious compared with the plastic molding machines that use the screw vibration mode.

REFERENCE NUMERALS 1. injection oil cylinder; 2. injection base frame; 3. motor; 4. transmission mechanism; 5. base; 6. radial thrust bearings; 7. hopper; 8. machine barrel; 81. plasticizing cavity; 82. injection barrel; 9. plasticizing rotor; 91; hemispherical rotor; 911. external thread groove; 92. cylinder; 10. electric heater; 11. vibration apparatus; 12. movement controller; 13. moving oil cylinder; 14. gear; 15. plunger; and 16. check valve.

DETAILED DESCRIPTION

Specific embodiments of the present invention will be further described below with reference to drawings. It should be indicated herein that descriptions for these embodiments are used to help understanding the present invention, but not used to limit the present invention. In addition, the technical features involved in the following described embodiments of the present invention can be mutually combined as long as the technical features do not conflict with each other.

In the description of the present invention, orientations or position relationships indicated by the terms "left", "right" and the like are orientations or position relationships shown based on the drawings, are only for convenience of describing the present invention, but not require that the present invention must be constructed and operated in specific orientations. Therefore, the description should not be considered as a limitation to the present invention.

Embodiment 1

Figure 1:
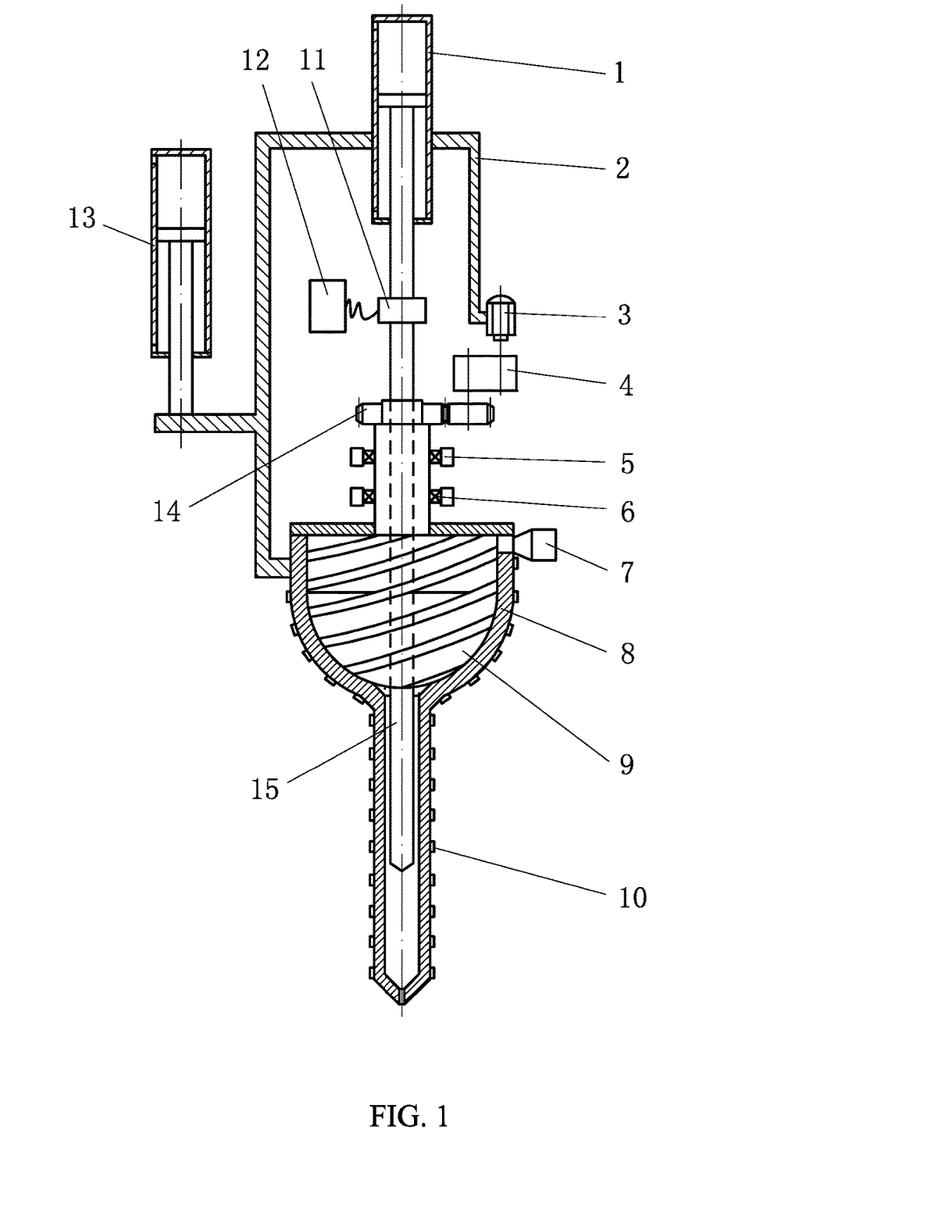
FIG. 1 is a structural schematic diagram of the embodiment 1 of the present invention.
Figure 2:
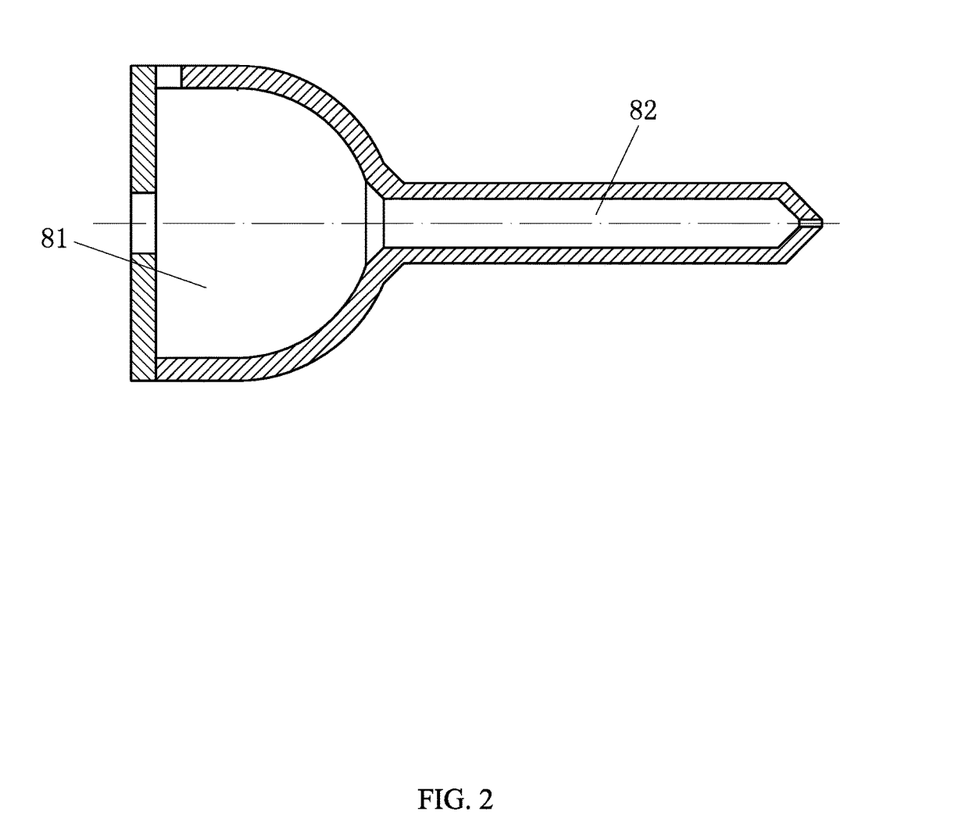
FIG. 2 is a structural schematic diagram of a machine barrel in FIG. 1.
Figure 3:
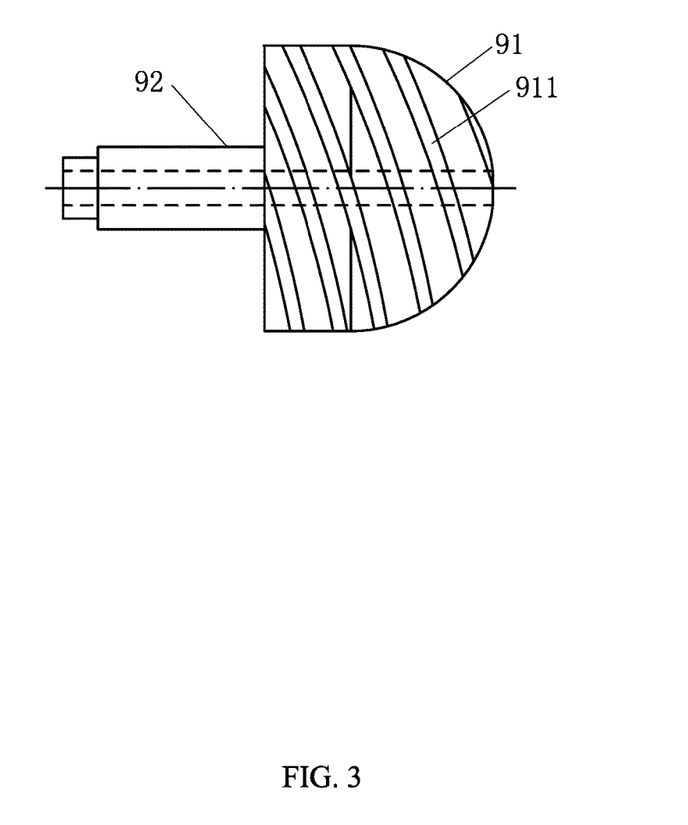
FIG. 3 is a structural schematic diagram of a plasticizing rotor in FIG. 1.

As shown in FIG. 1 to FIG. 3, an injection molding apparatus with a spherical rotor comprises an injection oil cylinder 1, an injection base frame 2, a motor 3, a transmission mechanism 4, bases 5, radial thrust bearings 6, a hopper 7, a machine barrel 8, a plasticizing rotor 9, an electric heater 10, a vibration apparatus 11, a movement controller 12, a moving oil cylinder 13, a gear 14 and a plunger 15, wherein the injection oil cylinder 1, the motor 3, the transmission mechanism 4 and the machine barrel 8 are fixed to the injection base frame 2.

The machine barrel 8 comprises a hemispherical plasticizing cavity 81 and an injection barrel 82, and the hopper 7 is installed on the plasticizing cavity 81 of the machine barrel 8.

The plasticizing rotor 9 comprises a hemispherical rotor 91 and a cylinder 92 which is connected with the hemispherical rotor 91 to form a whole body. The hemispherical rotor 91 is provided with a continuous external thread grooves 911, and center holes are formed in the hemispherical rotor 91 and the cylinder 92 respectively. The hemispherical rotor 91 is located in the hemispherical plasticizing cavity 81 and can rotate. The cylinder 92 is located outside the plasticizing cavity 81. The left end of the external thread groove 911 is communicated with the hopper 7. The right end of the external thread groove 911 is communicated with the injection barrel 82.

The Radial thrust bearings 6 and the gear 14 are installed on the cylinder 92. The radial thrust bearings 6 are installed on the bases 5. The motor 3 drives the transmission mechanism 4 to work. The transmission mechanism 4 drives the gear 14 to rotate. The gear 14 drives the cylinder 92 to rotate so as to drive the hemispherical rotor 91 to rotate in the plasticizing cavity 81, thereby completing the melting and plasticizing of the material.

The right end of the plunger 15 successively penetrates through the center holes of the cylinder 92 and the hemispherical rotor 91 and is located in the injection barrel 82. The right part of the plunger 15 is in clearance fit with the injection barrel 82. The plunger 15 can axially move in the center holes of the hemispherical rotor 91 and the cylinder 92 and the injection barrel 82 to finish injection of the molten material. The hemispherical rotor 91 and the cylinder 92 can rotate relative to the plunger 15. The plunger 15 is in clearance fit with the injection barrel 82.

The electric heater 10 is installed outside the machine barrel 8.

In order to inject the molten material into a mold cavity in a pulsation mode and continuously keep pressure and feed the plunger 15, the injection molding apparatus in the present embodiment also comprises a movement controller 12 and a vibration apparatus 11. The vibration apparatus 11 is installed between the plunger 15 and the push rod of the injection oil cylinder 1. The movement controller 12 controls the vibration of the vibration apparatus 11. The vibration apparatus 11 drives the plunger 15 to perform the following movements: axial vibration, circumferential vibration, and the axial vibration with the circumferential vibration or the vibration apparatus 11 drives the plunger 15 to perform circumferential rotation movement.

During work, the motor 3 drives the hemispherical threaded rotor 9 to rotate through the transmission mechanism 4 and the gear 14. The external thread groove 911 in the hemispherical rotor 91 and the plasticizing cavity 81 of the machine barrel 8 form a material plasticizing and conveying channel. Material in the hopper 7 enters the left end of the external thread groove 911 through a radial hole of the plasticizing cavity 81 of the machine barrel 8, moves to the right end of the hemispherical rotor 91 rightward along the external thread groove 911, then enters the injection barrel 82 of the machine barrel 8 and then fully fills the injection barrel 82 through a gap between the plunger 15 and the injection barrel 82. After the system finishes a mold closing process, the moving oil cylinder 13 drives the injection base frame 2 to move to the right and drives the whole plasticization and injection system including the injection oil cylinder 1, the motor 3, the transmission mechanism 4 and the machine barrel 8 to move to the right until an injection nozzle is fitted into and is communicated with a mold. Then, pressure oil is injected into the injection oil cylinder 1 to push the plunger 15 to perform a linear movement in the injection barrel 82 of the machine barrel 8. At the same time, the vibration apparatus 11 can drive the plunger 15 to vibrate so as to inject the molten material of the injection barrel 82 of the machine barrel 8 into the mold in the pulsation mode and continuously keep pressure and feed the plunger 15. The vibration of the plunger 15 is always kept until a workpiece is cooled and shaped in the mold cavity; and then the plunger 15 is retreated from the interior of the injection barrel 82 of the machine barrel 8, and the hemispherical rotor 91 starts to perform next round of rotational plasticization.

In the present embodiment, the inner hole of the injection barrel 82 is a straight-through hole; a gap, through which the melt can pass, is reserved between the external circular surface of the right part of the plunger 15 and the whole section of the inner hole of the injection barrel 82; and when the plunger 15 is in any axial position of the injection barrel 82 of the machine barrel 8, the plasticized melt can enter the right end of the injection barrel 82 through the gap under the pressure.

Embodiment 2

Figure 4:
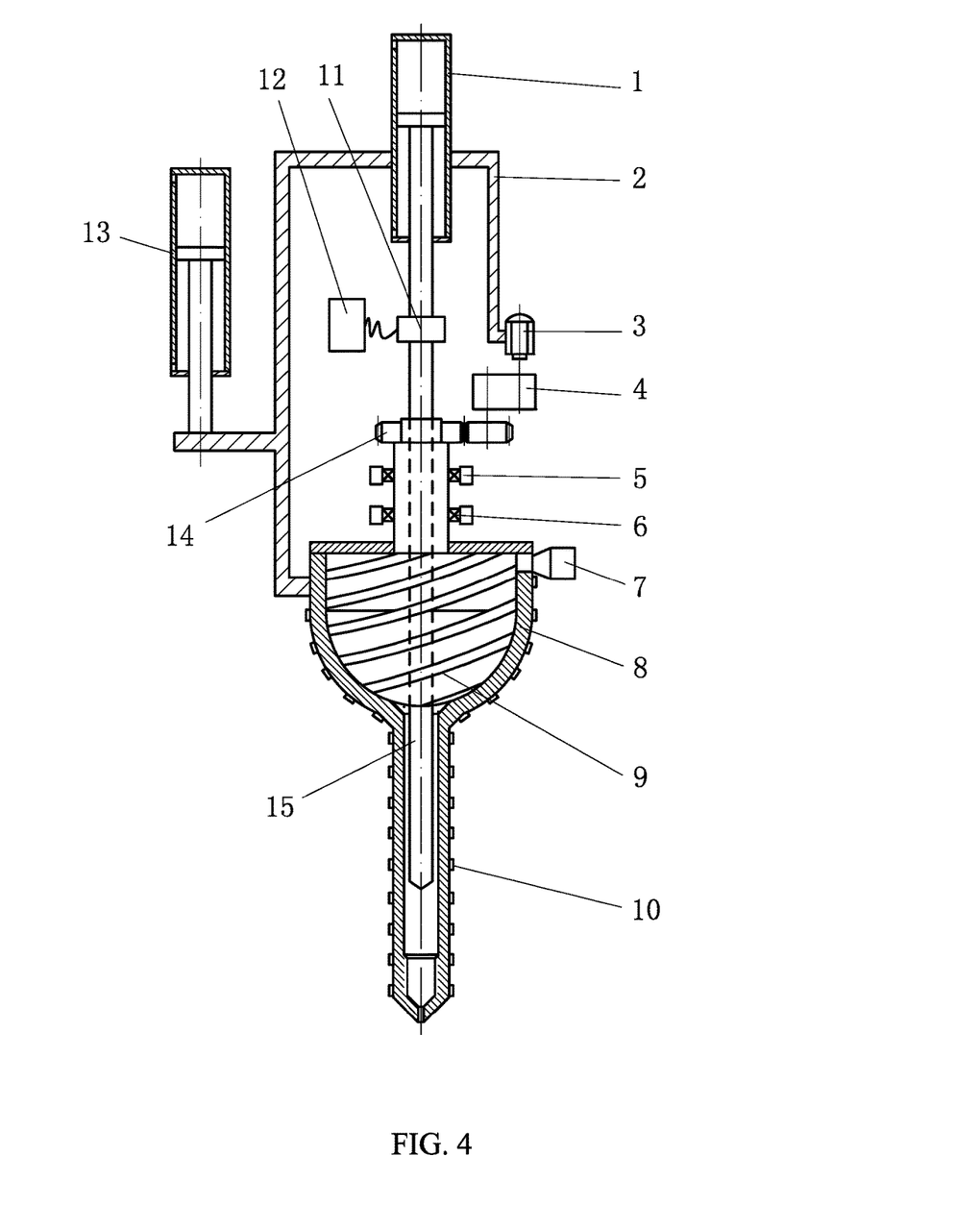
FIG. 4 is a structural schematic diagram of embodiment 2 of the present invention.

FIG. 4 shows an injection molding apparatus with a spherical rotor. The basic mechanism principle is substantially identical with that of the embodiment 1. Differences are as follows: the inner hole of the injection barrel 82 is a stepped hole; a portion with larger aperture in the stepped hole is communicated with the plasticizing cavity 81, and a portion with smaller aperture in the stepped hole is communicated with an injection hole; a certain gap is reserved between the external circular surface of the right part of the plunger 15 and a section with larger aperture in the stepped hole, and a plasticized melt can enter the right section of the injection barrel 82 through the gap under the pressure; the external circular surface of the right part of the plunger 15 is in sliding fit with the portion with smaller aperture in the stepped hole, but the melt cannot pass through the fitting gap between the external circular surface of the right part of the plunger and the portion; and the volume of the portion with smaller aperture in the stepped hole must be larger than a minimal injection quantity set by the injection machine. The work principle of embodiment 2 is substantially the same as that of embodiment 1, so will not be repeated.

Embodiment 3

Figure 5:
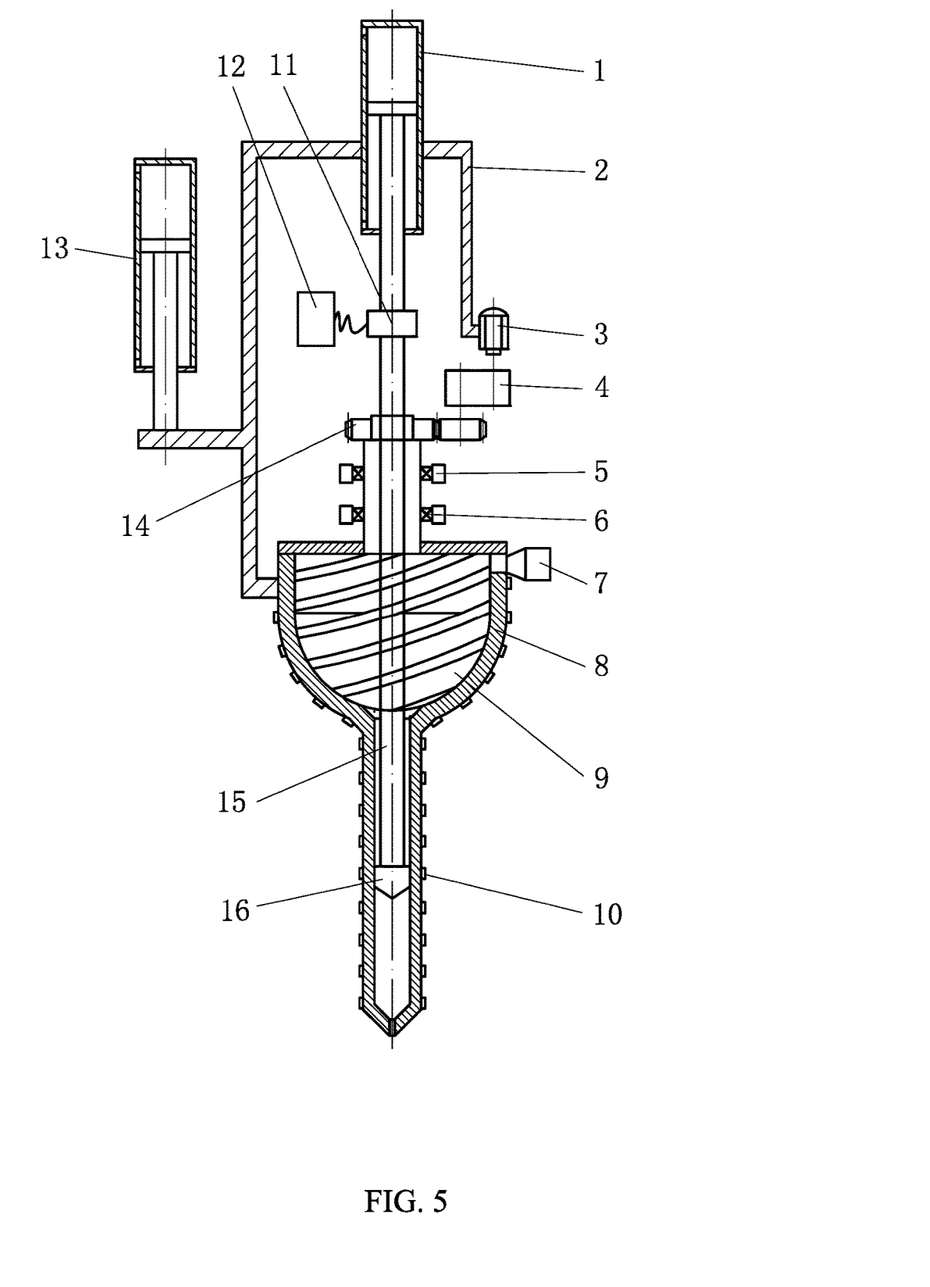
FIG. 5 is a structural schematic diagram of embodiment 3 of the present invention.

FIG. 5 shows an injection molding apparatus with a spherical rotor. The structure and the work principle are substantially identical with those of embodiment 1. Differences are as follows: the right end of the plunger 15 is provided with a check valve 16 which is used for preventing the material from returning; and the check valve 16 is located in the injection barrel 82 and can axially move in the injection barrel 82.

During work, the motor 3 drives the hemispherical rotor 91 to rotate through the transmission mechanism 4 and the gear 14. The external thread groove 911 in the hemispherical rotor 91 and the plasticizing cavity 81 of the machine barrel 8 form a material plasticizing and conveying channel. Material in the hopper 7 enters the external thread groove 911 in the external circumference of the hemispherical rotor 91 through a radial hole of the plasticizing cavity 81 of the machine barrel 8, moves to the right end of the hemispherical rotor 91 rightward along the external thread groove 911, then directly fully fills the injection barrel 82 of the machine barrel 8 through the check valve 16 at the right end of the plunger 15; after the system finishes a mold closing process, the moving oil cylinder 13 drives the injection base frame 2 to move to the right and drives the whole plasticization and injection system including the injection oil cylinder 1, the motor 3, the transmission mechanism 4 and the machine barrel 8 to move to the right until an injection nozzle is fit into and is communicated with a mold. Then pressure oil is injected into the injection oil cylinder 1 to push the plunger 15 and the check valve 16 to perform a linear movement in the injection barrel 82 of the machine barrel 8. At the same time, the vibration apparatus 11 can drive the plunger 15 and the check valve 16 to vibrate so as to inject the molten material of the injection barrel 82 of the machine barrel 8 into the mold in the pulsation mode and continuously keep pressure and feed the plunger 15. The vibration of the plunger is always kept until a workpiece is cooled and shaped in the mold cavity; and then the plunger 15 is retreated from the interior of the injection barrel 82 of the machine barrel 8, and the hemispherical rotor 91 starts to perform next round of rotational plasticization.

The embodiments of the present invention are described in detail above with reference to the drawings, but the present invention is not limited to the described embodiments. For those ordinary skilled in the art, various changes, modifications, substitutions and variations made to these embodiments without departing from the principle and intention of the present invention are included in the protection scope of the present invention.

What is claimed is:

1. An injection molding apparatus with a spherical rotor, comprising:
    an injection oil cylinder (1), an injection base frame (2), a motor (3), a transmission mechanism (4), bases (5), radial thrust bearings (6), a hopper (7), a machine barrel (8), an electric heater (10), a moving oil cylinder (13), a gear (14) and a plunger (15);
    wherein the injection oil cylinder (1), the motor (3) and the transmission mechanism (4) and the machine barrel (8) are installed on the injection base frame (2) and a push rod of the moving oil cylinder (13) is connected with the injection base frame (2);
    the injection molding apparatus further comprises a plasticizing rotor (9); the plasticizing rotor (9) comprises a hemispherical rotor (91) and a cylinder (92) integrated with the hemispherical rotor (91); continuous external thread grooves (911) are provided on the hemispherical rotor (91); center holes are provided on the hemispherical rotor (91) and the cylinder (92); the machine barrel (8) comprises a hemispherical plasticizing cavity (81) and an injection barrel (82); the hemispherical rotor (91) is located in the hemispherical plasticizing cavity (81) and is rotatable; the hopper (7) is installed on the plasticizing cavity (81); a left end of the external thread groove (911) is communicated with the hopper (7) and a right end of the external thread groove (911) is communicated with the injection barrel (82); the radial thrust bearings (6) and the gear (14) are installed on the cylinder (92); the radial thrust bearings (6) are installed on the bases (5); the plunger (15) is provided in the center holes of the hemispherical rotor (91) and the cylinder (92) as well as the injection barrel (82) and is axially movable; and a right part of the plunger (15) is in clearance fit with the injection barrel (82).

2. The injection molding apparatus with the spherical rotor of claim 1, further comprising:
    a vibration apparatus (11) and a movement controller (12); wherein the movement controller (12) controls a vibration of the vibration apparatus (11); the vibration apparatus (11) is installed between the plunger (15) and the push rod of the injection oil cylinder (1); and the vibration apparatus (11) drives the plunger (15) to perform movements of any one of axial vibration, circumferential vibration, axial vibration and the circumferential vibration at the same time or circumferential rotation movement.

3. The injection molding apparatus with the spherical rotor of claim 1, wherein an inner hole of the injection barrel (82) is a stepped hole; a portion with larger aperture in the stepped hole is communicated with the plasticizing cavity (81) of the machine barrel (8), and a portion with smaller aperture in the stepped hole is communicated with an injection hole; a gap is reserved between the external circular surface of the right part of the plunger (15) and the portion with larger aperture in the stepped hole, and a plasticized melt can enter the right section of the injection barrel (82) through the gap under the pressure; and the external circular surface of the right part of the plunger (15) is in sliding fit with the portion with smaller aperture in the stepped hole, and the plasticized melt does not pass through a fitting gap between the external circular surface of the right part of the plunger (15) and the portion.

4. The injection molding apparatus with the spherical rotor of claim 1, wherein an inner hole of the injection barrel (82) is a straight-through hole; a gap, through which a plasticized melt passes, is reserved between the external circular surface of the right part of the plunger (15) and the whole section of the inner hole of the injection barrel (82); and when the plunger (15) is in any axial position of the injection barrel (82), the plasticized melt enters into the right end through the gap under the pressure.

5. The injection molding apparatus with the spherical rotor according to claim 1, wherein the right end of the plunger (15) is provided with a check valve (16) for preventing the material backflow; and the check valve (16) is located in the injection barrel (82) and is axially movable in the injection barrel (82).

* * * * *